Oct. 15, 1968   F. J. KOZUB   3,405,658
DOUBLE SWIVEL MOUNT FOR TRANSPORTING LONG LOADS
Filed June 10, 1966
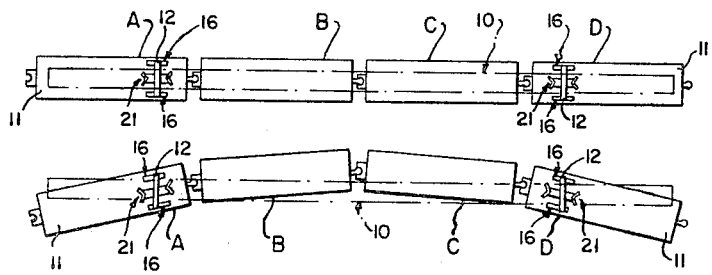
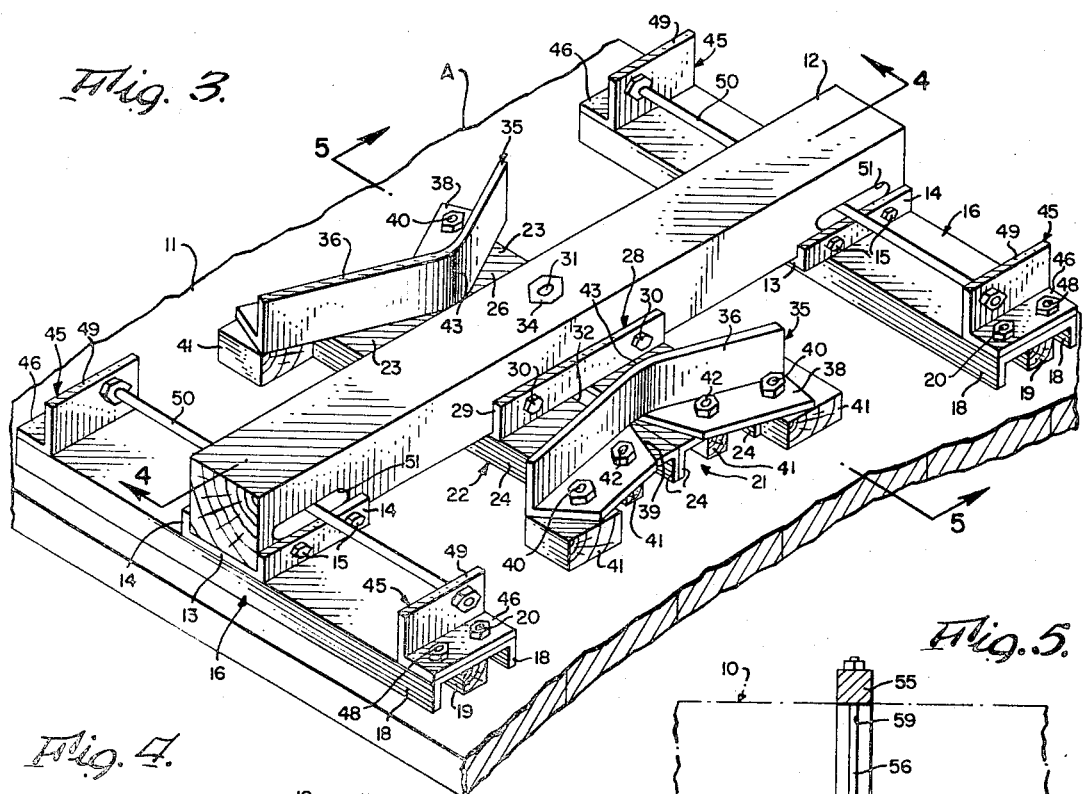
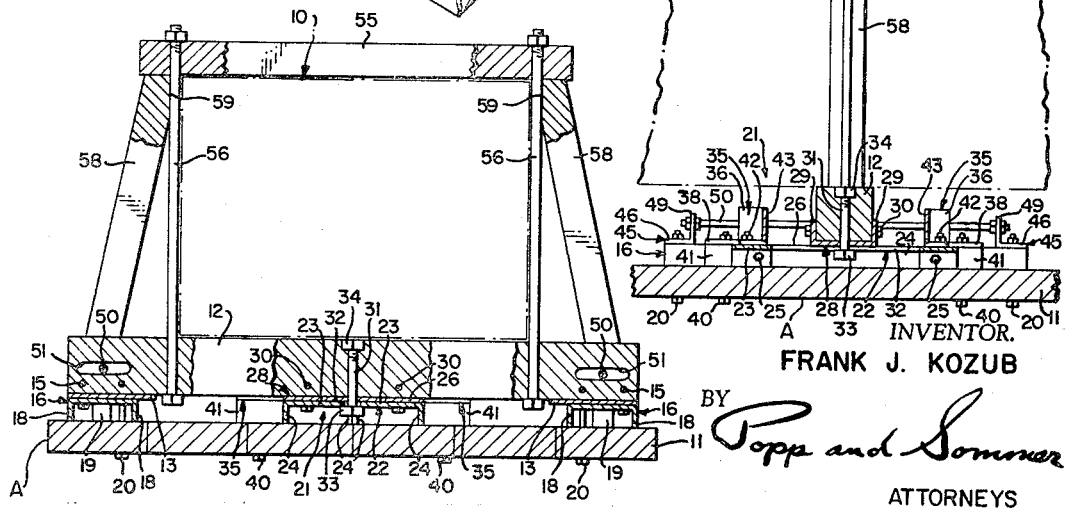
INVENTOR.
FRANK J. KOZUB
BY Popp and Sommer
ATTORNEYS — # United States Patent Office 3,405,658
Patented Oct. 15, 1968

3,405,658
DOUBLE SWIVEL MOUNT FOR TRANSPORTING
LONG LOADS
Frank J. Kozub, 3433 S. Creek, Hamburg, N.Y. 14075
Filed June 10, 1966, Ser. No. 556,681
8 Claims. (Cl. 105—367)

ABSTRACT OF THE DISCLOSURE

Each of two vertical swivel mounts for transporting long loads on tandem vehicles includes a load supporting cross beam slidable along longitudinal side plates spaced on each side of a longitudinal center plate. The cross beam is secured to the center plate for horizontal movement relative thereto both about a vertical swivel axis and also lengthwise of the line of vehicular travel to transmit sidesway forces of the load to the side plates which permit supported movement of the ends of each cross beam for maintaining alinement of the two beams transversely of the load when rounding curves and for permitting change in the position of the two vertical swivel axes relative to the vehicle in rounding curves. The cross beam also is attached to the end plates to permit handling of each swivel mount as a unitary structure composed of coupled parts.

---

This invention relates to a double swivel mount for supporting long loads in transit on tandem vehicles, and while the invention will be particularly described in conjunction with the use of two, three or four railroad flat cars, the invention is also applicable to use in conjunction with tandem highway vehicles for transporting such long loads.

One of the principal objects of the invention is to provide, in addition to the necessary movement of the king pins of such swivel mounts lengthwise of the line of travel toward and from each other in order to negotiate curves and turns, a swivel mount which provides a broad base for the load to compensate for sidesway or tipping forces encountered in transporting such long loads which have high centers of gravity.

Another important object is to provide such a swivel mount in which heavy duty bumper stops are provided for limiting the travel of the swiveling part of the mount both lengthwise of the line of travel of the vehicle and also angularly with respect to the tandem vehicles on which they are mounted. By such bumper stops the load is prevented from tearing either mount free from the tandem vehicle to which it is secured eliminating the consequent hazard of having one end of a heavy long load unsecured.

Another object is to provide such a swivel mount which is readily adapted for all types of loads, including large bundles of rolled steel which can be firmly clamped down by a simple top oak cross beam; light cylindrical tanks which require a different type of holddown, and special forms of fabricated steel structures which may require special and individual means for anchorage to the swiveling part of the mounts.

Another object is to proivde such a swivel mount which can be easily handled as a single unitary complex of parts joined together by means of a crane, both in mounting it for use on a vehicle; removing it therefrom; and transporting it back to the supplier of the long load for reuse.

Another object is to provide such a swivel mount which can be easily and quickly bolted to the bed or deck structure of the transporting vehicle, the securement requiring merely drilling eight bolt holes and the placement and tightening of eight anchor bolts.

Another object is to provide such a swivel mount which is simple and inexpensive considering the functions which it performs.

Other objects and advantages of the invention will become more apparent when considered with the specification and accompanying drawings, wherein:

FIG. 1 is a diminutive top plan view of four connected railroad flatcars depicting the position the cars would assume in traveling on a straight section of track, showing the inventive device as being mounted on the front and rear cars and illustrating in broken lines the load which may be any greatly elongated type; FIG. 2 is a view siimlar to FIG. 1 but illustrating the railroad flatcars and the inventive device mounted thereon in the position they would assume on rounding a curved section of track; FIG. 3 is an enlarged perspective view of one inventive device showing the same mounted on a railroad flatcar, fragmentarily illustrated, with the load removed; FIG. 4 is a transverse vertical sectional view thereof, on a reduced scale, this view being taken on line 4—4 of FIG. 3 and illustrating the load in broken lines; and FIG. 5 is a longitudinal vertical sectional view thereof, on a reduced scale, taken on line 5—5 of FIG. 3.

The double swivel mount of the present invention is designed for supporting in transit, very long loads represented by the numeral 10. Such long loads can be very heavy and very long, such as a load of rolled structural steel piles each adapted to be driven with interlocking edges into the ground 120 feet or more and each shipment of which may be 70 or more tons. The length of such loads is determined only by the existing curves, obstacles and turns or switches in the right of way, either railroad or highway, and the long load 10 is illustrated in FIGS. 1 and 2 as requiring four connected railroad flatcars A, B, C and D. Of these the end cars A and D are each equipped with one of the swivel mounts forming the subject of the present invention, the intermediate flatcars B and C merely connecting these end cars A and D into the train. When these flatcars negotiate a curve, as illustrated in FIG. 2, the long load 10 not only travels laterally outwardly of all of the flatcars, but is required to swivel about a vertical axis with reference to each of the flatcars A and D. Further, the swivel axes move lengthwise relative to the flatcars or tandem vehicle, FIG. 2, on rounding a curve and further apart on entering the straightaway, FIG. 1, so that provision must be made to permit movement of the king pins of these swivel mounts lengthwise of the line of travel of the train. Also the long load 10 can be very heavy; can be topheavy or have a high center of gravity; can be of many widths and heights and can have a wide variety of shapes. Accordingly, the swivel mount of the present invention must not only be rugged but must be adapted for positive and safe securement of all such types of long loads to the beds 11 of the flatcars and which beds are usually in the form of heavy planking capable of having vertical holes drilled therethrough to securely bolt down the swivel mounts as hereinafter described.

The main supporting member of each of the two swivel mounts severally bolted to the beds 11 of the flatcars A and D is in the form of an oak supporting cross beam 12, say, a 10 x 10 inch oak beam extending substantially the full width of the bed 11 of its flatcar. The ends of this cross beam 12 are each provided on its underside with a metal shoe 13 in the form of a structural steel channel having a flat bottom face and upstanding flanges 14 closely embracing the longitudinal upright side faces of the cross beam 12 and secured thereto in any suitable manner as by horizontal cross bolts 15.

The underside of each of these end shoes 13 has greased sliding support on elongated horizontal side plates 16 which extend lengthwise of the line of travel of the train and are preferably in the form of inverted structural steel channels having downwardly projecting longitudinal side flanges 18. Each side plate or channel 16 can be supported directly on the bed 11 or, for adjustment, can be supported at its ends on wooden blocks 19 and in either event each end of each of these side plates or channels is secured to the bed by a single vertical bolt 20 extending through the bed 11 and through a bolt hole in the channel or plate end 16. The blocks 19 can be selected or cut to different heights to suit the load and to adapt the height of the side plates or channels 16 to the central part 21 of the mount.

This center part 21 of the mount comprises a horizontal center plate indicated generally at 22 and made up of a pair of inverted channels 23 arranged with their flanges 24 projecting downwardly with one pair of these flanges being arranged in face-to-face relation to one another and bolted together, as indicated at 25, the two channels 23 forming a top plate face 26 which is greased and slidingly supports a shoe 28 at the center of the supporting oak cross beam 12. This shoe is in the form of a length of metal channel having upstanding flanges 29 which embrace the opposite vertical longitudinal sides of the oak beam 12 at its center and can be secured thereto by cross bolts 30 passing through these flanges.

The swivel mounting for the oak cross beam 12 on the center plate 22 comprises a king pin in the form of a vertical bolt 31 which passes vertically through the center of the oak cross beam 12 the center of the shoe 28 and through a slot 32 provided through the opposing flanges of the two channels 23 which constitute the center plate 22, this slot extending lengthwise of the line of travel of the train. The head 33 of the bolt is arranged below this slot 32 and travels along the underside of the center plate 22. The nut 34 of this bolt or king pin 31 is countersunk into the top of the wooden cross beam 12.

An important feature of the invention resides in the provision of heavy duty bumper stops limiting the horizontal movement of the oak cross beam 12 lengthwise of the line of movement of the train. These stops are provided both at the center and the opposite ends of the oak cross beam. At the center these stops are arranged fore and aft of the oak cross beam 12 and each comprises metal angle 35 having one flange 36 projecting upwardly and its other flange 38 notched at its center, as indicated at 39, the flange 38 being bent about a vertical axis so that it is V-shaped in plan with its opposite ends being arranged in outwardly diverging relation to the vertical longitudinal sides of the oak cross beam 12. The opposite extremities of the bottom flange portion 38 of each of these V-shaped bumper stops 35 is secured to the bed or deck 11 of the flatcar by means of a vertical bolt 40 passing through the bed, one of a pair of wooden supporting blocks 41 and the flange portion 38. Between the pair of bolts 40, the horizontal bottom flange portion 38 of each bumper 35 is secured to the top face or web of each inverted channel 23 constituting the top plate 22 by means of a pair of bolts 42. The central closely spaced noses 43 of the vertical flanges 36 of the bumper stops 35 are arranged to engage the vertical side flanges 29 of the central shoe 28.

The opposite ends of the oak cross beam 12 are limited in their travel, lengthwise of the movement of the train by bumper stops in the form of metal angle bars 45 each having a bottom flange 46 secured to each end of each side plate 16 by a bolt 48, in addition to being secured thereto by the bolt 20 which also secures the end of its side plate 16 to the bed 11 of the flatcar, as previously described. Each bumper stop 45 has an upright flange 49 which is arranged in the path of the adjacent upstanding flange 14 of the corresponding end shoe 13, thereby to limit movement of the oak cross beam 12 lengthwise of the line of travel of the train.

A feature of the invention resides in having the entire swivel mount composed of parts that are connected together so that upon removing the eight bolts 20 and 40 which go through the bed or deck 11 of the flatcar, the entire swivel mount can be picked up, by means of a crane, and removed so that the flatcar can be put to other service, and so that the two swivel mounts can be stacked for shipment back to the steel plant or other place where the long loads originate. To this end, and also to provide an additional safe guard against one end of the oak cross beam 12 lifting free from the corresponding side plate 16, a horizontal tie rod 50 is anchored at its opposite ends in the vertical flanges 49 of the bumper stop 45 for each side plate 16. Each of these tie rods extends through a horizontal slot 51 provided through the adjacent end of the oak cross beam 12, this slot being of sufficient width, transversely of the line of movement of the train, to permit the shoes 13 to come into engagement with the bumper stops 45, the vertical flanges 36 of the central bumper stops 35 also being angled to permit such movement.

The long load 10 can be secured on top of the two oak cross beams 12 of the two swivel mounts in any conventional manner to insure that the load will not slip or become displaced. To this end, at each end of the long load 10 a top wooden cross beam 55 of, say, 6 x 8 inch oak is placed on top of each end of the load 10 directly above and parallel with each supporting oak cross beam 12. Each top cross beam 55 can then be drawn down into clamping engagement with the long load 10 by means of vertical tie bolts 56 at the opposite ends of each top cross beam 55. In addition, sway braces 58 can be provided. Conventionally these are made of, say, 4 x 6 oak beams with their upper and lower ends cut to fit the upper and lower faces of the top and bottom oak beams 55 and 12, respectively, the top end of each sway brace also preferably being notched, as indicated at 59, to fit around the corresponding vertical tie bolt 56. These sway braces can be spiked to the cross beams 12 and 55 and serve to provide angular stiff leg stabilizers at the sides and top of the load 10.

The manner in which the swivel mounts of the present invention are secured to the freight cars will depend upon the length of the load 10. Thus, for shorter loads only two flatcars would be used with the swivel mounts secured to remote ends of the flatcars; with longer loads three flatcars would be used with the swivel mount secured to the adjacent ends of the first and third cars, and with very long loads, as illustrated, four flatcars would be used with the mount secured adjacent the centers of the endmost flatcars. In each instance there will be some overhang of the long load beyond the swivel mounts.

Accordingly with each type of load the swivel support should be mounted at a different location on each flatcar. To facilitate this it will be noted that all parts of the swivel support are connected together so that in installing each swivel mount on the bed 11 of its flatcar it can be lifted as a unitary complex by means of a crane and dropped down on its flatcar at the proper location. The crane can also be used in assisting locating the different components in proper relation to one another at exactly the desired position on the flatcar by supporting the major part of the weight of the load while the workmen swing the oak cross beam 12 to be crosswise of the flatcar and the center plate 22 and end plates 16 lengthwise thereof. After being properly positioned, by means of a power wood drill, holes are drilled through the bed 11 of the flatcar in line with the eight bolt holes in the side plates 16 and bumper stops 35 which are to receive the eight anchoring bolts 20 and 40. These anchoring bolts are then inserted through the bed 11 and swivel mount and their nuts tightened and, if any leveling or alining is required, such is done by the selection or cutting of the blocks 19 and 41. The flatcars are then coupled together to receive the load 10.

The manner of securing the load 10 on the pair of supporting oak cross beams 12 of the two swivel mounts will depend upon the nature of the load such as a strap mounting (not shown) for long tanks, or, for the load 10 illustrated, which can be assumed to be a rectangular bundle of separate, long, rolled metal piles, the load would be mounted on the two supporting oak cross beams 12, the upper clamping oak beams 55 and bottom oak supporting beams 12 being provided with vertical drill holes alined outside of the load, and the tie bolts 56 being inserted in these drill holes and the nuts of these tie rods tightened to clamp the load securely between the four oak beams. Thereafter the sway braces 58 would be cut and their notches 59 fitted around upper ends of the vertical tie bolts 56 and their upper and lower ends spiked against the oak cross beams 55 and 12 to provide diagonal stiff leg resistance to sidesway of the load.

The train of flatcars is now ready for transit but before sending it out on the main line of the railroad it can be tested by switching the cars around in the yards of the supplier. In such switching the king pins 31, which constitute the two vertical pivot axes of the two mounts will move toward and from each other in accordance with the degree of curvature of the tracks and switches as well as with the stretch and contraction of the flatcars in starting and stopping the train. Such is accommodated by the slots 32 in the center plate 22 which permit these king pins 31, and the oak cross beams 12 to move lengthwise of the line of travel of the train with their shoes 13 and 28 sliding on the greased upper surfaces of the center plate 22 and side plates 16.

The load 10 can have a high center of gravity because of the wide outboard positioning of the side plates 16, 16 and further any toppling of the load from the flatcars is resisted by the horizontal tie rods 50 and 50 which prevent upward displacement of either end of the oak beams 12 and 12. Further, these rods hold the side plates 16 to the oak cross beam 12 when the mount is being shifted around, as by means of a crane.

In such testing transit through the switches of the supplier's freight yards, while the required movement of the oak cross beams 12 both toward and from each other, and angularly with respect to their freight cars, as illustrated in FIG. 2, is permitted the bumpers and stops 35 and 45 provide a positive limit to such movement and insure that the load does not become uncentered to such an extent as to tear one swivel mount from its flatcar in negotiating a curve in the right of way on the main line of the railroad. It will be noted that because of the V-shape, in plan, of the upstanding flanges 36 of the center plate bumper stops 35 the angular movement of the oak cross beam 12 is not prevented at either extreme position of the king pin 31 along the slot 32 and such movemnet is limited by the bumper stops 45 of the two side plates 16.

It will be seen that the present invention provides a safe secure swivel mounting for long loads and that while the invention has been particularly described in connection with railroad use, features of the invention can also be advantageously applied to tandem highway vehicles in transporting long loads.

I claim:

1. A vertical axis swivel mount adapted to form one of a pair used on the deck structures (11) of tandem vehicles (A, B, C, D) to transport long loads (10) of such length as to change the spacing of the axes of the pair of swivel mounts when the tandem vehicles (A, B, C, D) negotiate curves in the right of way, wherein the improvement comprises an elongated load supporting cross beam (12) arranged above the deck structure (11) to extend transversely of the line of travel of the vehicle, a pair of separate side plates (16) widely spaced from each other and arranged adjacent opposite sides of the deck structure (11) and supporting and extending transversely of the opposite ends of said supporting cross beam (12), separate means (20) securing each of said side plates (16) to said deck structure (11), a separate horizontal center plate (22) arranged in spaced relation to and between said side plates (16) and arranged under the center of said supporting cross beam (12), separate means (40) securing said center plate (22) to said deck structure (11), means (31, 32) securing said supporting cross beam (12) to said center plate (22) for horizontal movement relative thereto both about a vertical swivel axis and also lengthwise of the line of travel of the vehicle, whereby the sidesway forces of such long loads (10) fixed to a pair of such supporting cross beams (12) on separate vehicles (A, B, C, D) is transmitted to said widely spaced side plates (16) which also permit supported movement of the ends of said supporting cross beams (12) both in maintaining alinement of said supporting cross beams (12) transversely of said long load (10) in rounding curves and also in permitting changing in the position of said axes relative to the vehicles in so rounding curves, and means (45, 50) attaching said end plates (16) to the ends of said load bearing cross beam (12) whereby the swivel mount comprising said end plates (16) and load bearing cross beam (12) can be handled as a unitary structure composed of coupled parts.

2. A vertical axis swivel mount as set forth in claim 1 wherein said securing means (20, 40) for each of said side (16) and center (22) plates comprises bolts (20, 40) passing therethrough fore-and-aft, with reference to said line of travel, of said load supporting cross beam (12) and anchored in said deck structure (11), whereby the swivel mount can be removed by merely removing such anchor bolts (20, 40).

3. A vertical axis swivel mount as set forth in claim 1 wherein said means (45, 50) attaching said end plates (16) to the ends of said load bearing cross beam (12) comprises a rod (50) arranged in spaced relation above each side plate (16) and extending lengthwise of said line of travel through a horizontal slot (51) in the companion end of said load bearing cross beam (12), and means (45) securing each end of each of said rods (50) to the adjacent end of the companion side plate (16).

4. A vertical axis swivel mount as set forth in claim 3 wherein said last means (45) also form bumper stops limiting the fore-and-aft travel of the ends of the load bearing cross beam (12) with reference to the said line of travel.

5. A vertical axis swivel mount as set forth in claim 1 additionally including upwardly projecting bumper stops (35) fixed to said center plate (22) and limiting the fore-and-aft travel of the center of the load bearing beam (12) with reference to said line of travel.

6. A vertical axis swivel mount as set forth in claim 5 wherein each of said bumper stops (35) is V-shaped in plan with the working faces of the pair of bumper stops diverging relative to each other from the center toward the sides of the vehicle.

7. A vertical axis swivel mount as set forth in claim 1 wherein said load bearing cross beam (12) is provided on its underside with metal shoes (28, 13) severally slidingly supported on said center (22) and end (16) plates, and said metal shoes (28, 13) are in the form of channel bars with upstanding flanges (29, 14) closely embracing the sides of the load supporting cross beam (12), and fasteners (30, 15) extending through said flanges (29, 14) into said beam (12).

8. A vertical axis swivel mount as set forth in claim 1 wherein said plates (16, 22) are in the form of channel bars having depending longitudinal side flanges (18, 24) extending lengthwise of said line of travel.

References Cited

UNITED STATES PATENTS

| | | | |
|---|---|---|---|
| 1,242,390 | 10/1917 | Turnbow | 280—404 |
| 1,308,039 | 7/1919 | Cadman | 280—404 |
| 1,351,102 | 8/1920 | Feigelson | 280—404 |
| 1,996,695 | 4/1935 | Bigley | 280—144 |
| 2,271,808 | 3/1942 | Starkey | 280—404 |

DRAYTON E. HOFFMAN, *Primary Examiner.*